US007488201B2

(12) United States Patent
Yoon et al.

(10) Patent No.: US 7,488,201 B2
(45) Date of Patent: Feb. 10, 2009

(54) TERMINAL-CONNECTING MEANS

(75) Inventors: Junill Yoon, Seoul (KR); Jong-yul Ro, Seoul (KR); Do Yang Jung, Hwaseong-si (KR); Yeo Won Yoon, Daejeon (KR)

(73) Assignee: LG Chem, Ltd. (KR)

( * ) Notice: Subject to any disclaimer, the term of this patent is extended or adjusted under 35 U.S.C. 154(b) by 273 days.

(21) Appl. No.: 11/406,642

(22) Filed: Apr. 19, 2006

(65) Prior Publication Data

US 2006/0246781 A1 Nov. 2, 2006

(30) Foreign Application Priority Data

Apr. 19, 2005 (KR) .................. 10-2005-0032503

(51) Int. Cl.
*H01R 13/52* (2006.01)
(52) U.S. Cl. .................. 439/521; 439/522; 439/213
(58) Field of Classification Search .................. 439/521, 439/522, 213, 709, 718, 467
See application file for complete search history.

(56) References Cited

U.S. PATENT DOCUMENTS

| 3,018,320 | A | * | 1/1962 | Rowe | 174/99 B |
| 4,415,044 | A | * | 11/1983 | Davis | 174/138 F |
| 5,645,448 | A | * | 7/1997 | Hill | 439/522 |
| 6,176,720 | B1 | * | 1/2001 | Johnson | 439/213 |
| 6,435,888 | B1 | * | 8/2002 | Reed, Jr. | 439/213 |
| 6,544,070 | B1 | * | 4/2003 | Radliff | 439/596 |
| 6,756,869 | B2 | * | 6/2004 | Takami et al. | 335/162 |
| 6,870,103 | B1 | * | 3/2005 | Wiant et al. | 174/68.2 |
| 7,334,315 | B2 | * | 2/2008 | Wiant et al. | 29/592.1 |

FOREIGN PATENT DOCUMENTS

KR 10-2006-0047061 5/2006

* cited by examiner

*Primary Examiner*—Hien Vu
(74) *Attorney, Agent, or Firm*—Cantor Colburn LLP

(57) ABSTRACT

Disclosed herein is a terminal-connecting device including an electrically insulating hollow connecting device body having an open upper end, and an electrically insulating cover coupled to the open upper end of the connecting device body. The terminal-connecting device is constructed such that a plate-shaped conductive bus bar is mounted to the lower end of the connecting device body, two or more terminal insertion holes are formed in the lower end of the connecting device body and the bus bar, the terminal insertion holes formed in the lower end of the connecting device body communicating with the terminal insertion holes formed in the bus bar, and a connecting member insertion slit is formed in one side of connecting device body for allowing further connection of the corresponding electrode terminal to an external connecting member, as occasion demands. The electrical connection between the electrode terminals and the electrical connection between the external connecting member and the corresponding electrode terminal can be easily and conveniently accomplished through the use of the terminal-connecting device according to the present invention. Also, the terminal connection part is isolated from the outside, whereby the occurrence of short circuits and the occurrence of corrosion due to moisture are effectively prevented. The terminal-connecting device according to the present invention is preferably used in manufacturing a medium- or large-sized battery system, especially, for electric vehicles and hybrid electric vehicles.

10 Claims, 6 Drawing Sheets

TERMINAL-CONNECTING MEANS

FIELD OF THE INVENTION

The present invention relates to a terminal-connecting device, and, more particularly, to a terminal-connecting device that is capable of accomplishing the electrical connection between batteries, the electrical connection between battery cartridges, the electrical connection between the terminals of other power supplies, or the electrical connection between an external connecting member and the corresponding electrode terminal, thereby accomplishing easy connection and preventing the connection part from being exposed to the outside, and therefore, preventing the occurrence of short circuits and protecting the connection part from being corroded due to foreign matter.

BACKGROUND OF THE INVENTION

Recently, a secondary battery, which can be charged and discharged, has been widely used as an energy source for wireless mobile devices. Also, the secondary battery has attracted considerable attention as a power source for electric vehicles and hybrid electric vehicles, which have been developed to solve problems, such as air pollution, caused by existing gasoline and diesel vehicles using fossil fuel.

Small-sized mobile devices use one or several small-sized cells for each device. On the other hand, medium- or large-sized devices, such as vehicles, use a medium- or large-sized battery module having a plurality of cells electrically connected with each other because high output and large capacity is necessary for the medium- or large-sized devices.

Generally, a battery module is manufactured by electrically connecting a plurality of battery cartridges, each of which has a plurality of unit cells connected in series and/or parallel with each other. According to circumstances, two or more battery modules are electrically connected with each other to provide a medium- or large-sized battery system having higher output.

Consequently, there is needed a connecting member that is capable of effectively performing the electrical connection between the batteries (including the unit cells), the electrical connection between the battery cartridges, and the electrical connection between the battery modules, and the electrical connection for receiving power from the battery modules and supplying the power to an external device. Furthermore, the connection between the electrode terminals and the corresponding connecting members is required when a signal, such as voltage, is outputted to control the operation of the batteries as a power source.

On the other hand, the terminal connection part (which is used as a concept including the connection part between an external device and the corresponding electrode and the connection part between a detection device and the corresponding electrode as well as the connection part between the electrode terminals as described above) is a part which can be easily short-circuited and easily corroded due to moisture. For this reason, careful attention is required during the manufacture or during the use thereof.

Although some conventional apparatuses and methods for isolating the terminal connection part from the outside have been proposed, no apparatus that is capable of fundamentally preventing the above-mentioned problems has been developed yet.

SUMMARY OF THE INVENTION

Therefore, the present invention has been made to solve the above problems, and other technical problems that have yet to be resolved.

Specifically, it is an object of the present invention to provide a terminal-connecting device that is capable of easily accomplishing the electrical connection between electrode terminals.

It is another object of the present invention to provide a terminal-connecting device that is capable of isolating a terminal connection part from the outside, thereby preventing the occurrence of short circuits and protecting the terminal connection part from being corroded due to moisture.

It is yet another object of the present invention to provide a terminal-connecting device that is capable of having the above-mentioned effects even when an external connecting member is connected to the corresponding electrode terminal.

In accordance with the present invention, the above and other objects can be accomplished by the provision of a terminal-connecting device comprising: an electrically insulating hollow connecting device body having an open upper end; and an electrically insulating cover coupled to the open upper end of the connecting device body, wherein the terminal-connecting device is constructed such that a plate-shaped conductive bus bar is mounted to the lower end of the connecting device body, two or more terminal insertion holes are formed in the lower end of the connecting device body and the bus bar, the terminal insertion holes formed in the lower end of the connecting device body communicating with the terminal insertion holes formed in the bus bar, and a connecting member insertion slit is formed in one side of connecting device body for allowing further connection of the corresponding electrode terminal to an external connecting member, as occasion demands.

Consequently, when the electrode terminals are inserted into the terminal insertion holes formed in the lower end of the connecting device body of the terminal-connecting device according to the present invention, the electrode terminals are electrically connected with each other via the bus bar mounted to the lower end of the connecting device body, and therefore, the electrical connection is easily accomplished, and the terminal-connecting device according to the present invention can be easily removed as occasion demands. Also, the open upper end of the connecting device body is shielded by the cover such that the terminal connection part is isolated from the outside, and therefore, the occurrence of short circuits and the occurrence of corrosion due to moisture are effectively prevented. Furthermore, in the case that the external connecting member is to be electrically connected to the corresponding electrode terminal for the output of the power, the detection of voltage necessary to control the battery, or the electrical connection between the battery modules, the external connecting member can be inserted through the connecting member insertion slit, whereby the object of the present invention is accomplished. Even in this case, the effects due to the isolation of the connection part can also be obtained as described above.

The connecting device body and the cover are not particularly restricted so long as the connecting device body and the cover are made of an electrically insulating material. Preferably, the connecting device body and the cover are made of a general or engineering plastic resin, such as polypropylene, polystyrene, polycarbonate, acrylonitrile-butadiene-styrene (ABS), acrylic acid resin, nylon, or polyester.

The connecting device body is not particularly restricted so long as the connecting device body is formed in a hollow shape. Preferably, the connecting device body is constructed in a rectangular structure.

The cover may be detachably coupled to the open upper end of the connecting device body. In a preferred embodiment, the cover is hingedly connected to one side of the connecting device body, whereby the complete separation of the cover from the connecting device body is prevented.

Also, the cover is provided with coupling protrusions, and the connecting device body is provided with coupling grooves, which correspond to the coupling protrusions of the cover, respectively, whereby the cover is prevented from being easily separated from the connecting device body due to external impacts after the cover is coupled to the connecting device body.

The plate-shaped bus bar mounted to the lower end of the connecting device body serves to connect the electrode terminals inserted into the hollow connecting device body through the terminal insertion holes with each other. Since the number of the electrode terminals, which are inserted into the hollow connecting device body, is not particularly restricted, the number of the bus bars is not also restricted. For example, when two cathode terminals and two anode terminals are inserted in the connecting device body, two bus bars are used to connect these terminals in series with each other. Also, in the case that two or more terminal insertion holes are formed, these terminal insertion holes are not necessarily arranged in a straight line.

In a preferred embodiment, the connecting device body is provided at the inside surface thereof with downward-tapered fixing protrusions, which are slightly spaced apart from the lower end surface of the connecting device body such that the bus bar can be stably fixed to the lower end of the connecting device body. The distance between the fixing protrusions and the lower end surface of the connecting device body is equal to or slightly greater than the thickness of the bus bar. Consequently, when the bus bar is inserted into the connecting device body, the bus bar passes by the fixing protrusions, and is then located on the lower end of the connecting device body. However, it is difficult to separate the bus bar from the lower end of the connecting device body because the fixing protrusions are constructed in the downward tapered structure.

When two or more terminal-connecting devices according to the present invention are used, these terminal-connecting devices may be coupled with each other. The coupling between the terminal-connecting devices is accomplished in a variable or fixed coupling structure. For example, the variable coupling structure is a structure in which the coupling distance between the terminal-connecting devices can be varied as occasion demands. The variable coupling structure is not particularly restricted. The variable coupling structure is very convenient to use since the electrical connection between the terminal-connecting devices is accomplished depending upon the positional change of the electrode terminals.

Furthermore, the terminal-connecting device according to the present invention is variously used in a high-output and large-capacity battery system, especially, for electric vehicles and hybrid electric vehicles, although the terminal-connecting device according to the present invention may be used to connect terminals of general apparatuses.

BRIEF DESCRIPTION OF THE DRAWINGS

The above and other objects, features and other advantages of the present invention will be more clearly understood from the following detailed description taken in conjunction with the accompanying drawings, in which.

DESCRIPTION OF MAIN REFERENCE NUMERALS OF THE DRAWINGS

| | |
|---|---|
| 100: battery cartridge | 200: unit cell |
| 300: battery module | 400: terminal-connecting device |
| 500: external connecting member | |

DETAILED DESCRIPTION OF PREFERRED EMBODIMENTS

Now, a preferred embodiment of the present invention will be described in detail with reference to the accompanying drawings. It should be noted, however, that the scope of the present invention is not limited by the illustrated embodiment.

Figure 1:
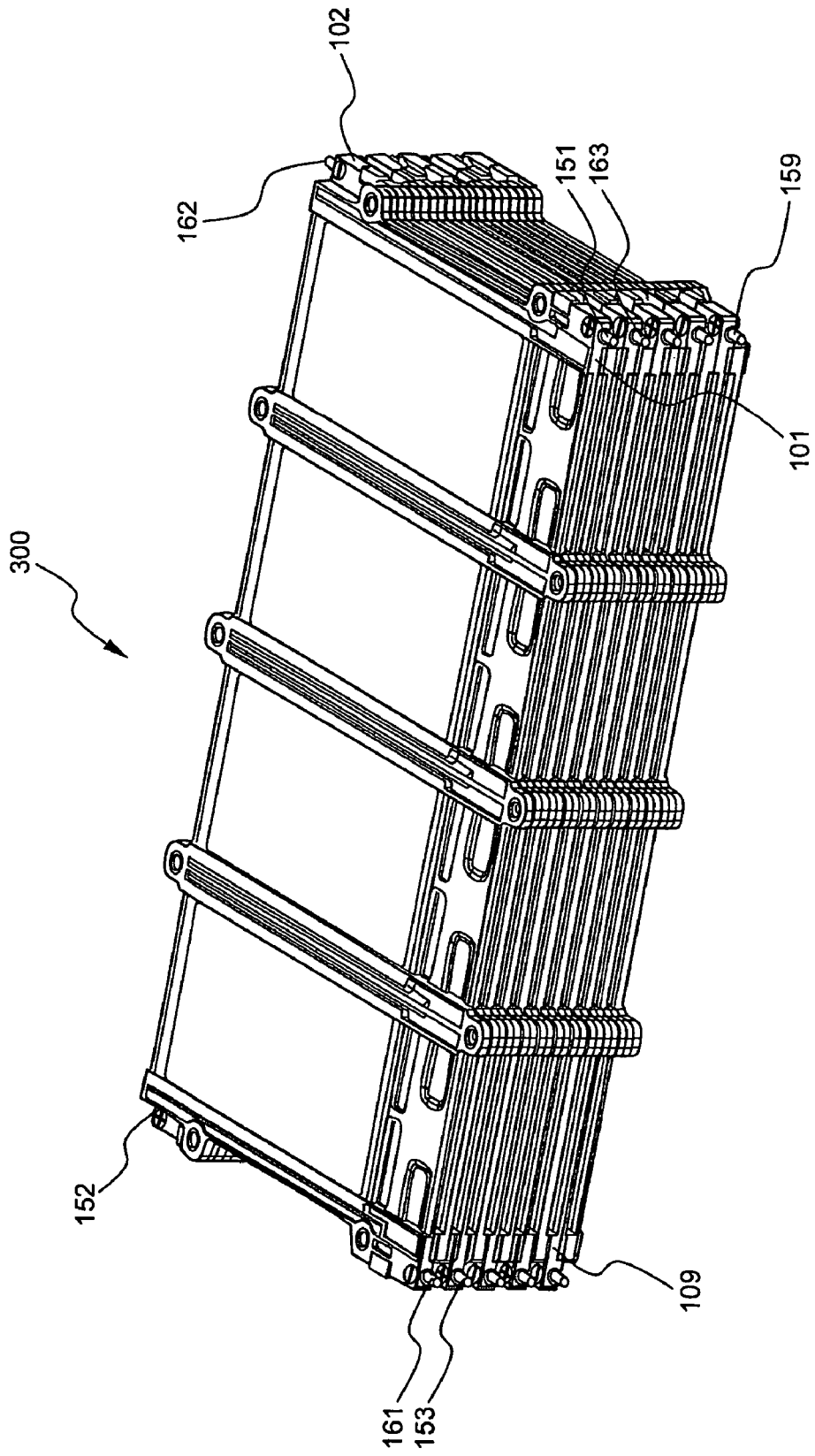
FIG. 1 is a partial perspective view illustrating an exemplary battery module, to which a terminal-connecting device according to the present invention can be applied.
Figure 2:
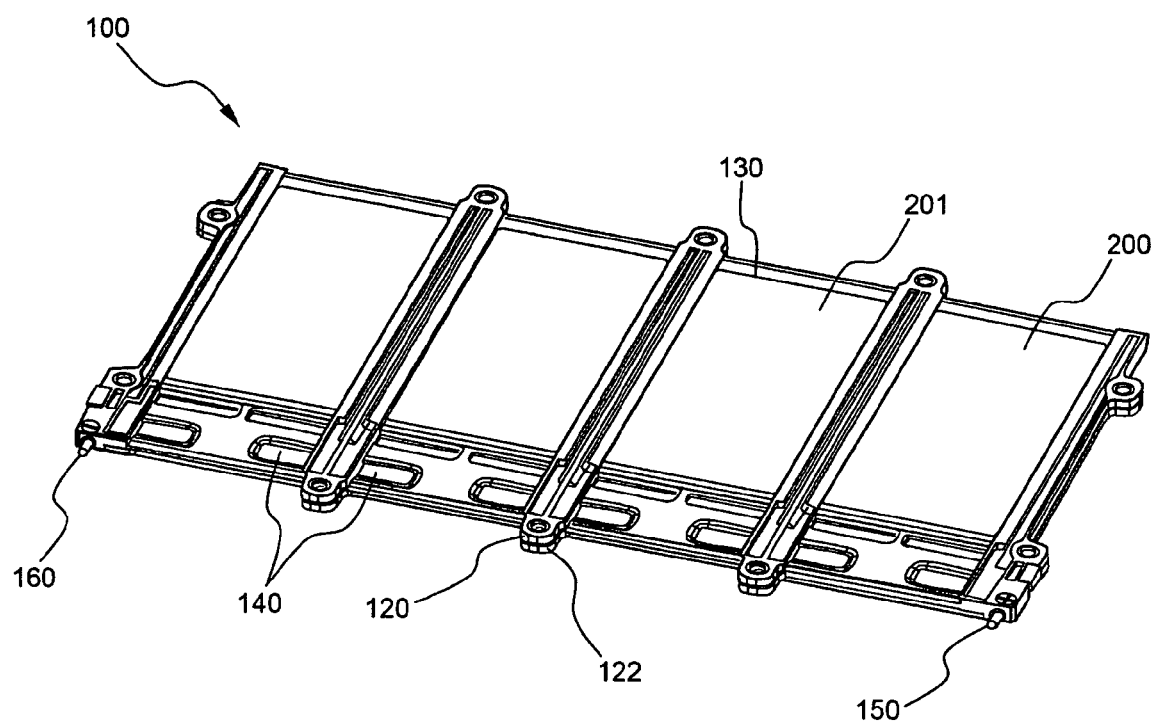
FIG. 2 is a perspective view illustrating one of battery cartridges constituting the battery module shown in FIG. 1.

FIG. 1 is a partial perspective view typically illustrating an exemplary battery module, to which a terminal-connecting device according to the present invention can be applied, and FIG. 2 is a perspective view typically illustrating one of battery cartridges constituting the battery module shown in FIG. 1.

Referring to these drawings, the battery cartridge 100 comprises a pair of frames 120 and 122, which are attached to each other. Unit cells 200 and 201 are located between the frames 120 and 122 while the frames 120 and 122 are separated from each other, and are then securely fixed between the frames 120 and 122 after the frames 120 and 122 are attached to each other. The unit cell 200 has an electrode lead (not shown), which is electrically connected to that of the neighboring unit cell 201 via a bus bar 140 located at the upper part of the battery cartridge 100. As shown in FIG. 1, the unit cells 200 and 201 are connected in series with each other, although the unit cells may be connected in parallel with each other according to circumstances. In this construction, the unit cells are electrically connected to a cathode terminal 150 and an anode terminal 160, which protrude from opposite sides of the upper end of the battery cartridge 100, respectively.

The battery module 300 is constructed such that ten cartridges are connected in series with each other in an alternate 180-degree orientation manner. Specifically, electrode terminals 151 and 161 of a first cartridge 101 and electrode terminals 152 and 162 of a second cartridge 102 are arranged in opposite orientations. On the other hand, electrode terminals 153 and 163 of a third cartridge 103 and the electrode terminals 151 and 161 of the first cartridge 101 are arranged in the same orientation. Also, electrode terminals 154 and 164 of a fourth cartridge 103 and the electrode terminals 152 and 162 of the second cartridge 102 are arranged in the same orientation. Such alternate orientations of the electrode terminals are the same for all the cartridges. Consequently, the electrode terminals of the odd-numbered cartridges 101, 103, 105, 107, and 109 and the electrode terminals of the even-numbered cartridges 102, 104, 106, 108, and 110 are arranged in the alternate 180-degree orientation manner.

The anode terminal 161 of the first cartridge 101 is connected to a battery management system (BMS), which is not shown in the drawings. The cathode terminal 151 of the first cartridge 101 is connected to the anode terminal 163 of the third cartridge 103 via a bus bar (not shown). The cathode terminal 153 of the third cartridge 103 is connected to the anode terminal 165 of the fifth cartridge 105. An example of the above-described alternate orientation structure is disclosed in Korean Patent Application No. 2004-92887, which has been filed in the name of the applicant of the present patent application. The disclosure of the above-mentioned patent application is hereby incorporated by reference as if fully set forth herein. This alternate orientation structure has advantages in that the connection length between the electrode terminals (for example, electrode terminals 151 and 163) is greater by the thickness of at least one cartridge than that of the non-alternate orientation structure. Also, the distance between the first terminal connection part 401 and the second terminal connection part 402 is greater by the thickness of at least one cartridge than that of the non-alternate orientation structure. Consequently, the connection of the electrode terminals is easily performed, and interference between the connecting members is minimized. Of course, the terminal-connecting device according to the present invention may also be used for the electrical connection of a battery module having a forward orientation structure as well as the above-described battery module having the alternate orientation structure.

However, in the forward orientation structure where the battery cartridges are arranged in the forward orientation manner or in the alternate orientation structure where the battery cartridges are arranged in the alternate orientation manner as shown in FIG. 1, the connection between the electrode terminals requires precision and skilled works.

Figure 3:
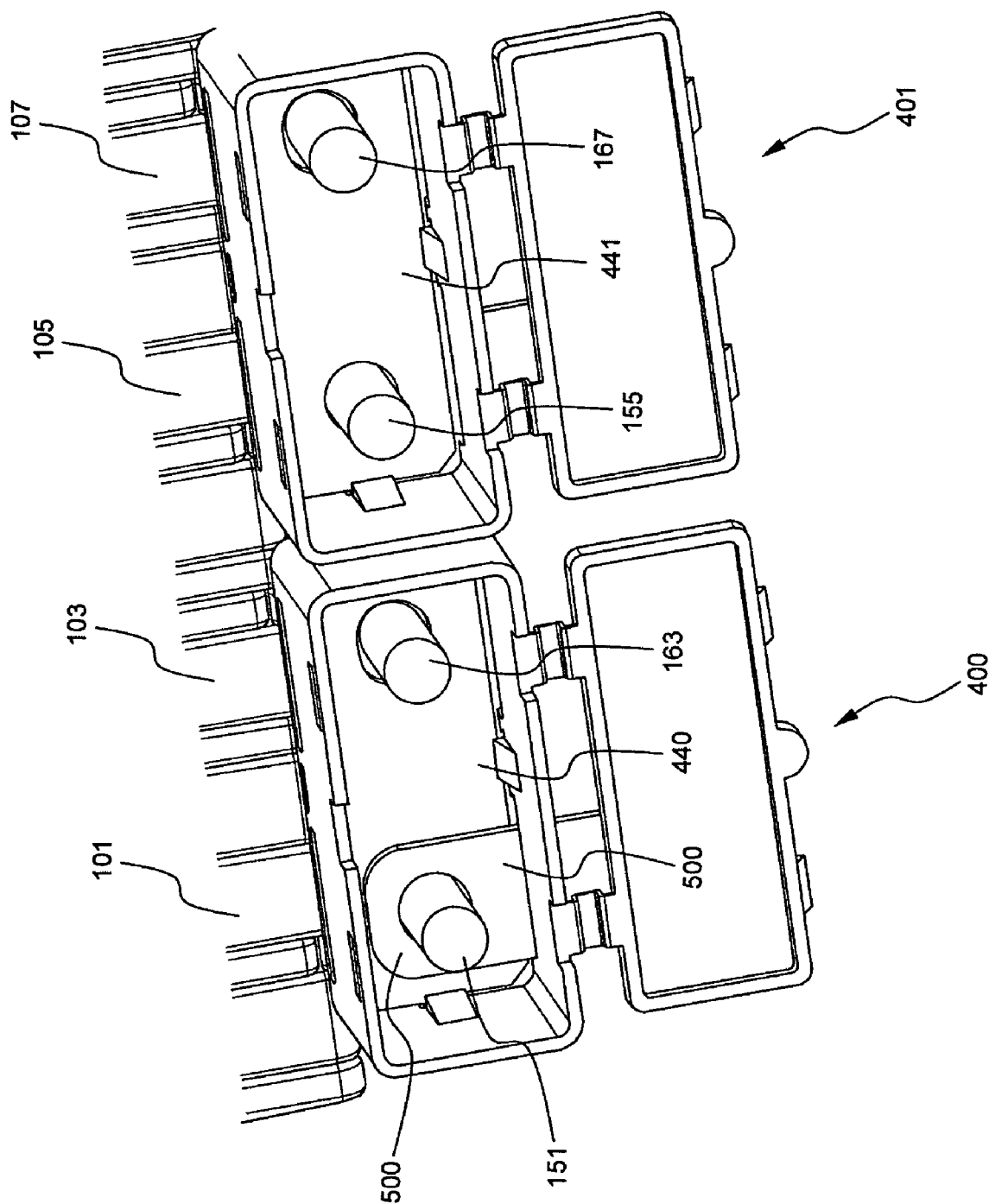
FIG. 3 is a partially enlarged view illustrating the connection between electrode terminals of the battery cartridges of the battery module shown in FIG. 1, which is accomplished by using a terminal-connecting device according to a preferred embodiment of the present invention.

FIG. 3 is a partially enlarged view illustrating the connection between electrode terminals of the battery cartridges of the battery module shown in FIG. 1, which is accomplished by using a terminal-connecting device according to a preferred embodiment of the present invention.

Referring to FIG. 3, the cathode terminal 151 of the first cartridge 101 is electrically connected to the anode terminal 163 of the third cartridge 103 via a bus bar 440 of a first terminal-connecting device 400. Also, the cathode terminal 155 of the fifth cartridge 151 is electrically connected to the anode terminal 167 of the seventh cartridge 107 via a bus bar 441 of a second terminal-connecting device 401. Furthermore, the first terminal-connecting device 400 has an external connecting member 500, which is connected to the cathode terminal 151 such that power can be outputted from the cathode terminal 151 through the external connection member 500.

Figure 4:
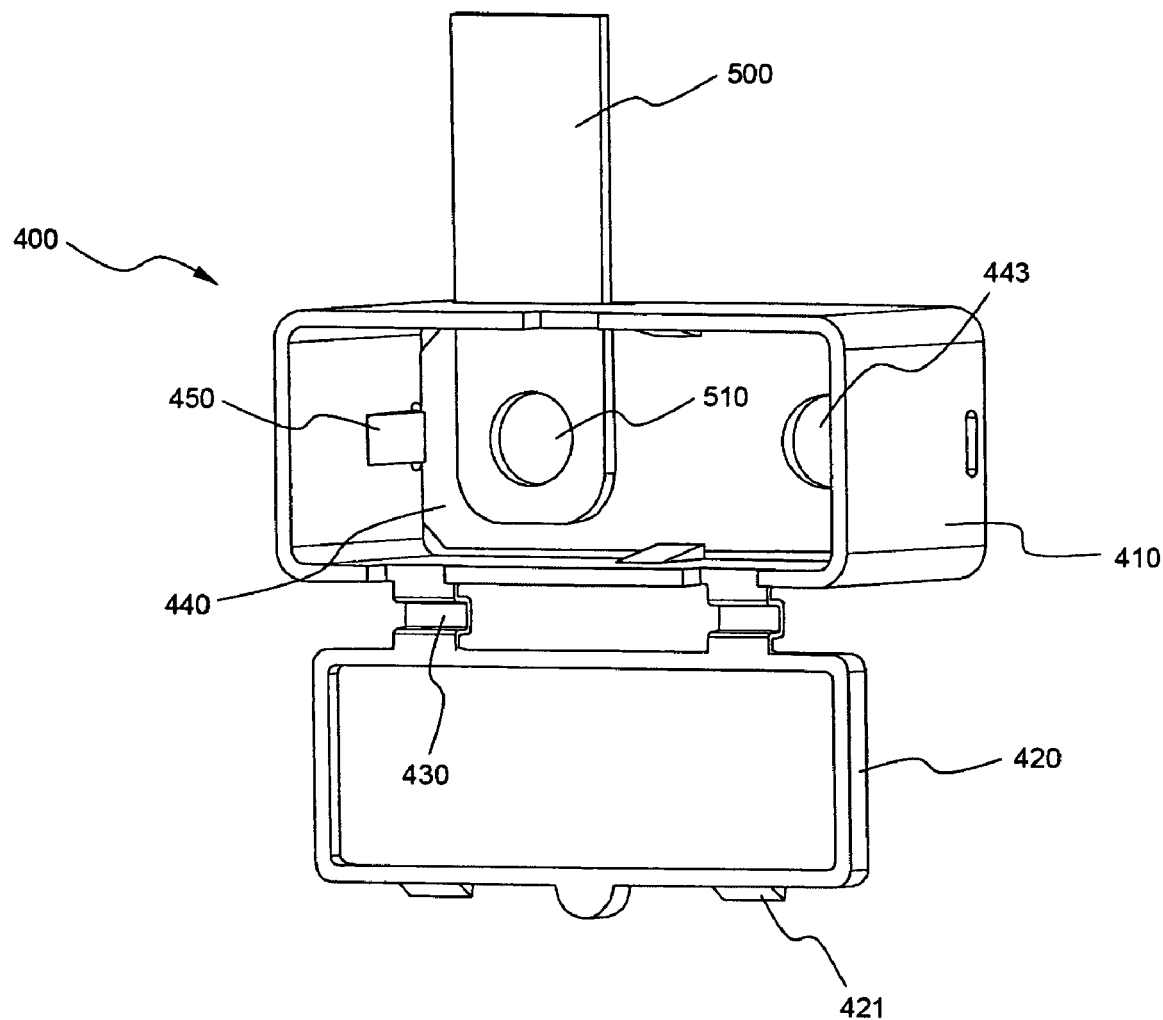
FIGS. 4 to 6 are perspective views respectively illustrating the top surface, the bottom surface, and the rear surface of the terminal-connecting device according to the preferred embodiment of the present invention with a connecting member being mounted to the terminal-connecting device.
Figure 5:
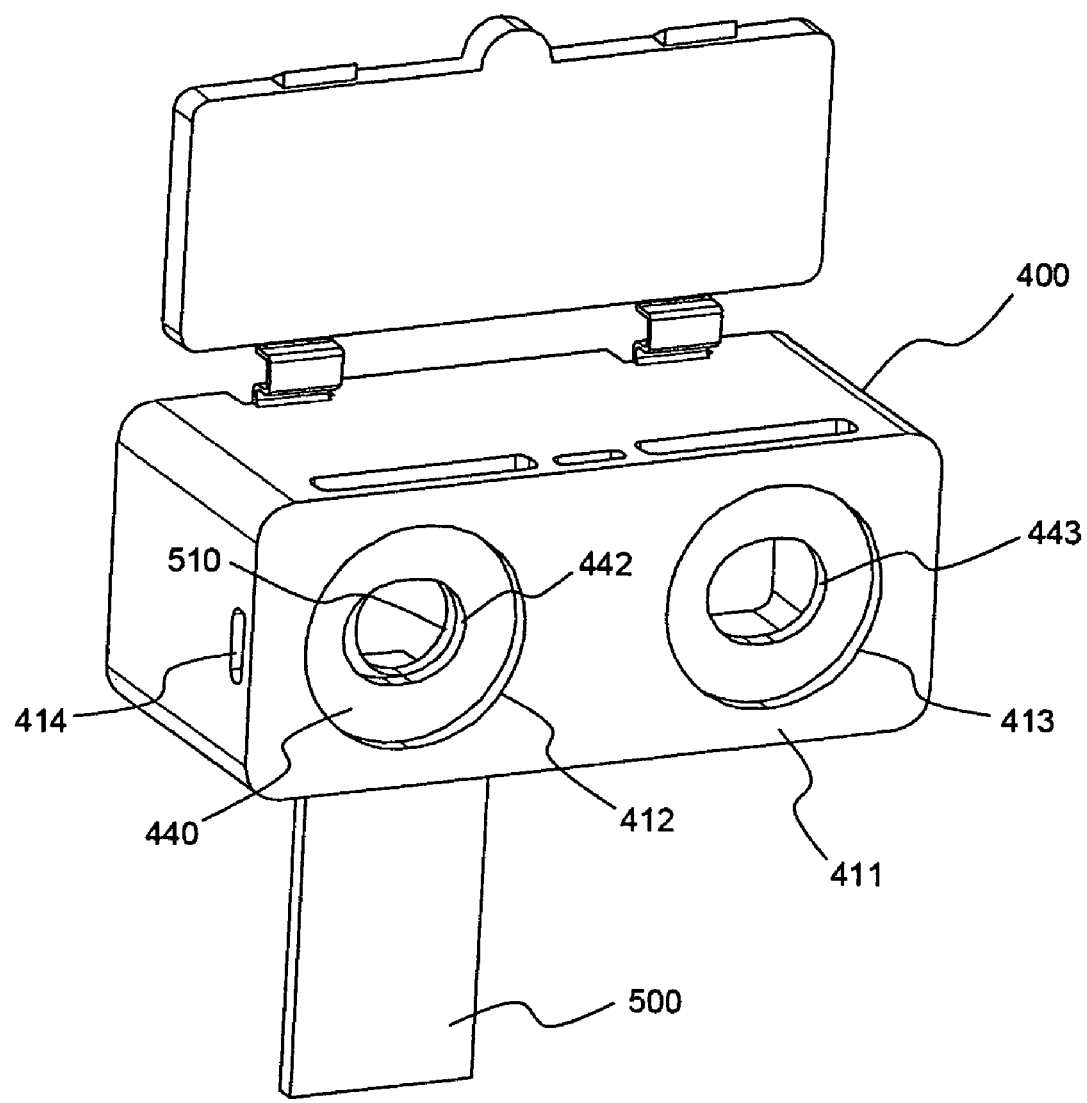
Figure 6:
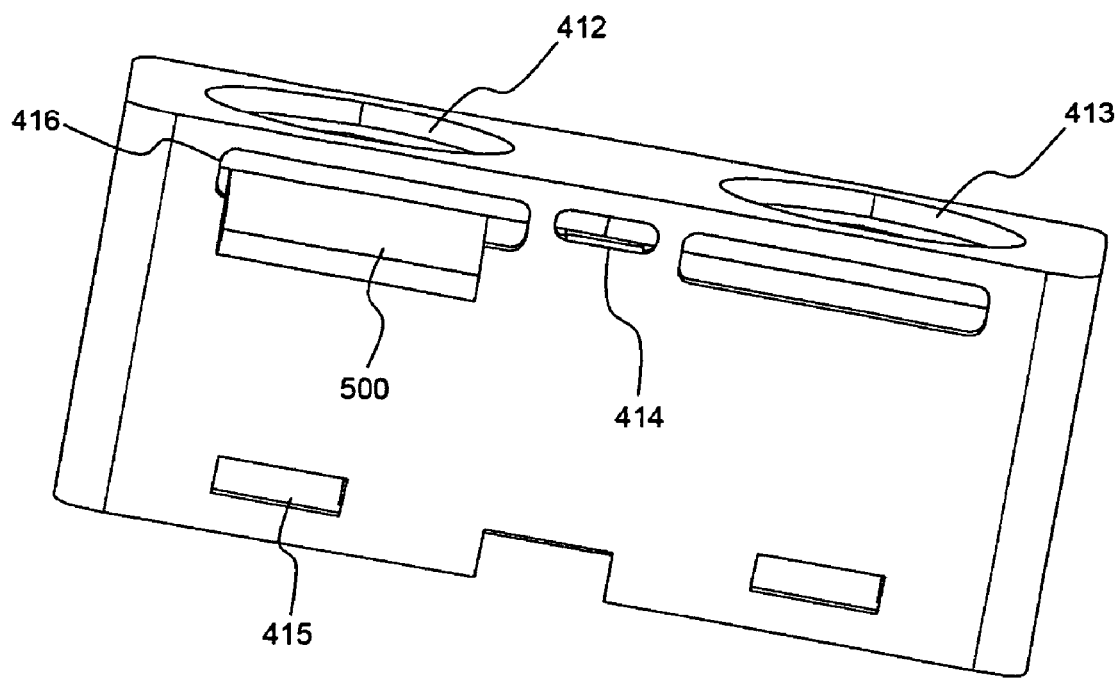

FIGS. 4 to 6 are perspective views respectively illustrating the top surface, the bottom surface, and the rear surface of the terminal-connecting device according to the preferred embodiment of the present invention with a connecting member being mounted to the terminal-connecting device.

Referring to these drawings, the terminal-connecting device 400 comprises: a box-shaped connecting device body 410 having an open upper end; and a cover 420 hingedly connected to one side of the open upper end of the connecting device body 410 via a pair of hinges 430.

To the lower end of the connecting device body 410 is mounted a plate-shaped conductive bus bar 440. In the lower end of the connecting device body 410 are formed two terminal insertion holes 412 and 413.

The bus bar 440 is stably fixed to the lower end of the connecting device body 410 by means of fixing protrusions 450 formed at the inside surface of the connecting device body 410. Each of the fixing protrusions 450 is constructed in a downward-tapered structure. Consequently, the bus bar 440 can be easily pushed to the lower end of the connecting device body 410. However, once the bus bar 440 is mounted to the lower end of the connecting device body 410, it is very difficult to separate the bus bar 440 from the lower end of the connecting device body 410. The fixing protrusions 450 are located at four positions of the inside surface of the connecting device body 410.

At the connecting device body 410 are formed grooves 414, which are disposed right under the fixing protrusions 450. The grooves 414 have a size equal to or slightly greater than the width of the fixing protrusions 450. For example, it is not easy to form the fixing protrusions 450, which have a small size and are constructed in the downward-tapered structure at the inside of the connecting device body 410, which has a closed lower end, such that the fixing protrusions 450 can be slightly spaced apart from the lower end surface 411 of the connecting device body 410, when the connecting device body 410 is formed by injection molding of a plastic resin. For this reason, a space for allowing a portion of the molding apparatus to be inserted thereinto is provided by the grooves 414 formed adjacent to the lower ends of the fixing protrusions 450 during the injection molding, whereby the formation of the above-described structure is possible. Alternatively, the grooves 414 may be formed when the fixing protrusions 450 are formed such that the fixing protrusions 450 are slightly spaced apart from the lower end surface 411 of the connecting device body 410 by forming the fixing protrusions 450 having the downward-tapered structure until the fixing protrusions 450 reach the lower end surface 411 of the connecting device body 410, and then removing portions of the fixing protrusions 450 through a drilling operation.

Also, two terminal insertion holes 442 and 443 are formed in the bus bar 440 such that the terminal insertion holes 442 and 443 formed in the bus bar 440 communicate with the terminal insertion holes 412 and 413 formed in the lower end of the connecting device body 410, respectively. As a result, as shown in FIG. 3, the electrode terminals are inserted into the connecting device body 410 through the terminal insertion holes 412 and 413 formed in the lower end of the connecting device body 411 and the terminal insertion holes 442 and 423 formed in the bus bar 440.

The cover 420 has a size sufficient to completely cover the open upper part of the connecting device body 410. At the cover 420 are formed coupling protrusions 421, which are disposed opposite to the hinges 430. At the side surface of the connecting device body 410 are also formed coupling grooves 415, which correspond to the coupling protrusions 421. Consequently, the coupling force between the cover 420 and the connecting device body 410 is increased by the engagement of the coupling protrusions 421 of the cover 420 in coupling grooves 415 of the connecting device body 410, respectively.

As described above, the terminal-connecting device 400 is used in the case that the external connecting member 500 is electrically connected to the corresponding electrode terminal not only for the connection between the electrode terminals but also for the output of the power, the detection of voltage necessary to control the battery, or the electrical connection between the battery modules. For this reason, a connecting member insertion slit 416 is formed in the side of the connecting device body 410 such that the external connecting member 500 can be inserted through the connecting member insertion slit 416. As shown in the drawings, the external connecting member 500 is preferably constructed in a plate-shaped strip structure. In the external connecting member 500 is formed a connection hole 510 corresponding to the size of the electrode terminal. Consequently, when the external connecting member 500 is to be connected to the corresponding electrode terminal by the terminal-connecting device 400, as shown in the drawings, the external connecting member 500 is mounted to the terminal-connecting device 400, and then the terminal-connecting device 400 is located at the corresponding electrode terminals.

Although the preferred embodiment of the present invention has been disclosed for illustrative purposes, those skilled in the art will appreciate that various modifications, additions and substitutions are possible, without departing from the scope and spirit of the invention as disclosed in the accompanying claims.

INDUSTRIAL APPLICABILITY

As apparent from the above description, the electrical connection between the electrode terminals and the electrical connection between the external connecting member and the corresponding electrode terminal can be easily and conveniently accomplished through the use of the terminal-connecting device according to the present invention. Also, the terminal connection part is isolated from the outside, whereby the occurrence of short circuits and the occurrence of corrosion due to moisture are effectively prevented. The terminal-connecting device according to the present invention is widely used in the electrical connection between the terminals without particular limits while the terminal-connecting device provides the above-described effects. Preferably, the terminal-connecting device according to the present invention is used in manufacturing a medium- or large-sized battery system, especially, for electric vehicles and hybrid electric vehicles.

What is claimed is:

1. A terminal-connecting device to electrically connect the electrode terminals with each other comprising:
    an electrically insulating hollow connecting device body having an open upper end; and
    an electrically insulating cover coupled to the open upper end of the connecting device body, wherein
    the terminal-connecting device is constructed such that a plate-shaped conductive bus bar is mounted to a lower end of the connecting device body; two or more terminal insertion holes are formed in the lower end of the connecting device body and the bus bar, the terminal insertion holes formed in the lower end of the connecting device body communicating with the terminal insertion holes formed in the bus bar; and a connecting member insertion slit is formed in one side of connecting device body for allowing further connection of electrode terminals to an external connecting member, as occasion demands,
    wherein the connecting device body is provided at the inside surface thereof with downward-tapered fixing protrusions, which are slighty spaced apart from the lower end surface of the connecting device body such that the bus bar can be stably fixed to the lower end of the connecting device body,
    wherein when the electrode terminals are inserted into the terminal insertion holes formed in the lower end of the connecting device body of the terminal-connecting device, the electrode terminals are electrically connected with each other via the bus bar mounted to the lower end of the connecting device body.

2. The terminal-connecting device according to claim 1, wherein the connecting device body and the cover are made of a plastic resin.

3. The terminal-connecting device according to claim 1, wherein the connecting device body is constructed in a rectangular hollow structure.

4. The terminal-connecting device according to claim 1, wherein the cover is hingedly connected to one side of the connecting device body.

5. The terminal-connecting device according to claim 1, wherein the cover is provided with coupling protrusions, and the connecting device body is provided with coupling grooves, which correspond to the coupling protrusions of the cover, respectively, whereby the cover is prevented from being easily separated from the connecting device body due to external impacts after the cover is coupled to the connecting device body.

6. The terminal-connecting device according to claim 1, wherein the distance between the fixing protrusions and the lower end surface of the connecting device body is equal to or slightly greater than the thickness of the bus bar.

7. The terminal-connecting device according to claim 1, wherein the connecting device body is provided at the side thereof with holes, which are disposed right under the fixing protrusions, and which have a size equal to or slightly greater than the width of the fixing protrusions.

8. The terminal-connecting device according to claim 1, wherein the terminal-connecting device is used to electrically connect an external connecting member to the corresponding electrode terminal, for the purpose of the output of the power, the detection of voltage necessary to control the battery, or the electrical connection between the battery modules, in addition to the electrical connection between the electrode terminals.

9. The terminal-connecting device according to claim 1, wherein two or more terminal-connecting devices are coupled with each other in a variable or fixed coupling structure.

10. The terminal-connecting device according to claim 1, wherein the terminal-connecting device is used in a high-output and large-capacity battery system for electric vehicles and hybrid electric vehicles.

* * * * *